Jan. 29, 1963 T. M. WRIGHT 3,075,196

WIRE STAPLE HANDLING APPARATUS

Filed June 22, 1960 11 Sheets-Sheet 1

INVENTOR.
Theodore M. Wright
BY
Morris L. Rabkin
ATTORNEY.

Jan. 29, 1963 T. M. WRIGHT 3,075,196

WIRE STAPLE HANDLING APPARATUS

Filed June 22, 1960

11 Sheets-Sheet 2

INVENTOR.
Theodore M. Wright
BY
Morris L. Rabkin
ATTORNEY.

INVENTOR.
Theodore M. Wright
BY
Morris A. Rabkin
ATTORNEY.

INVENTOR.
Theodore M. Wright
BY Morris A. Rabkin
ATTORNEY.

WIRE STAPLE HANDLING APPARATUS

Filed June 22, 1960 11 Sheets-Sheet 5

INVENTOR.
Theodore M. Wright
BY Morris B. Rabkin
ATTORNEY.

WIRE STAPLE HANDLING APPARATUS

Filed June 22, 1960 11 Sheets-Sheet 6

INVENTOR.
Theodore M. Wright
BY
Morris L. Rabkin
ATTORNEY.

WIRE STAPLE HANDLING APPARATUS

Filed June 22, 1960 11 Sheets-Sheet 7

INVENTOR.
Theodore M. Wright
BY Morris L. Lebkin
ATTORNEY.

INVENTOR.
Theodore M. Wright
BY Morris L. Rabkin
ATTORNEY.

Jan. 29, 1963 T. M. WRIGHT 3,075,196

WIRE STAPLE HANDLING APPARATUS

Filed June 22, 1960 11 Sheets-Sheet 9

INVENTOR.
Theodore M. Wright
BY Morris L. Rabkin
ATTORNEY.

INVENTOR.
Theodore M. Wright
BY Morris L. Rabkin
ATTORNEY.

Jan. 29, 1963 T. M. WRIGHT 3,075,196

WIRE STAPLE HANDLING APPARATUS

Filed June 22, 1960 11 Sheets-Sheet 11

INVENTOR.
Theodore M. Wright
BY
Morris A. Rabkin
ATTORNEY.

United States Patent Office 3,075,196 Patented Jan. 29, 1963

3,075,196

WIRE STAPLE HANDLING APPARATUS

Theodore M. Wright, 934 Haddon Ave., Camden, N.J.

Filed June 22, 1960, Ser. No. 37,994
10 Claims. (Cl. 1—95)

Figure 1:
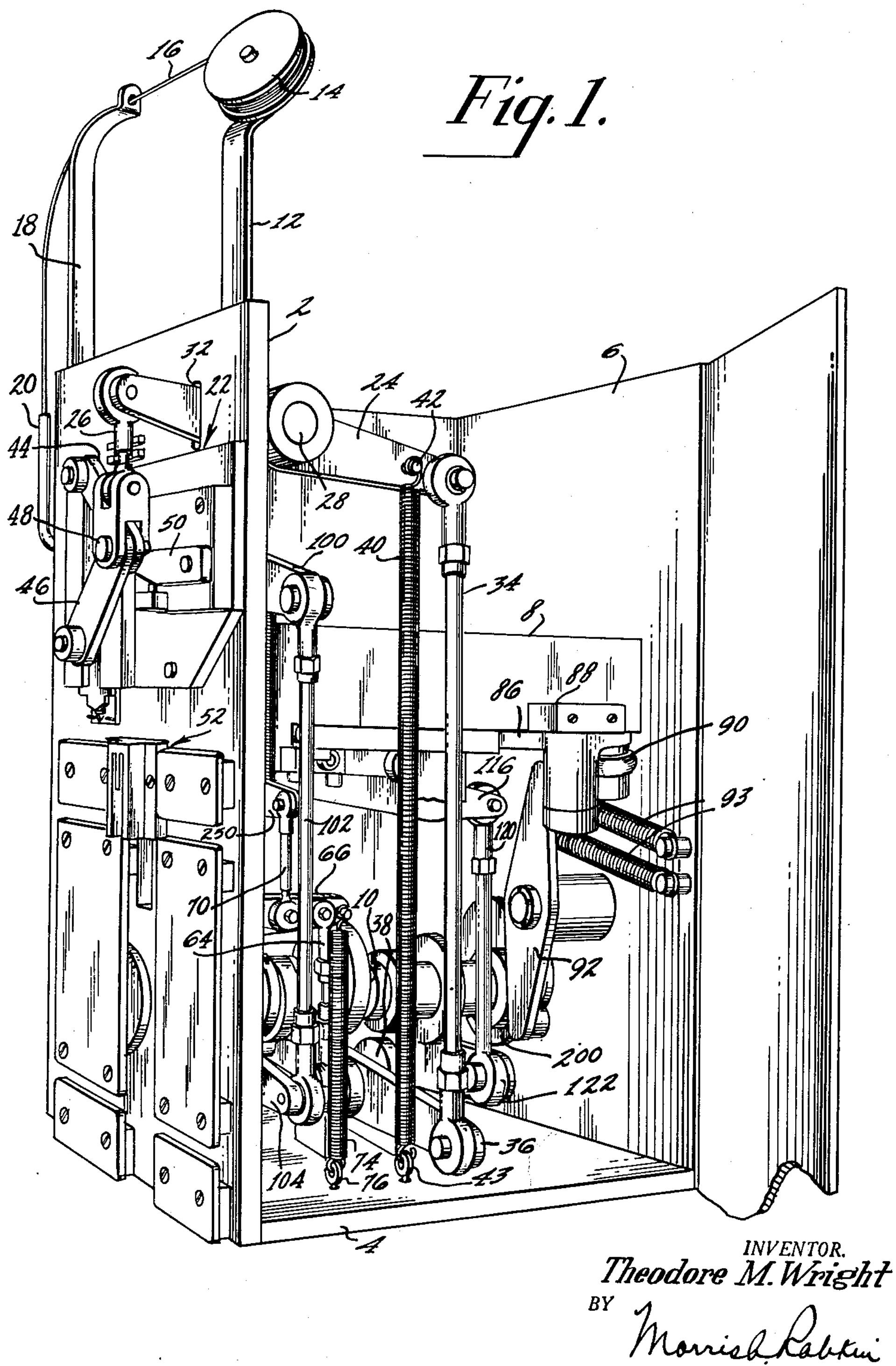

This invention relates to wire staple handling apparatus, and more particularly to apparatus for forming wire staples and securing them to sheets of material in spaced relation to the edges of the sheets, the present invention being in the nature of an improvement over that disclosed in my U.S. Patent No. 2,896,214, granted on July 28, 1959.

In my said patent, there is disclosed apparatus for forming out of severed lengths of wire U-shaped staples and attaching them to sheet members along an edge thereof. Such staples, which are of the general type illustrated in U.S. Patent No. 1,825,140, granted to K. F. Berthold on Sept. 29, 1931, and U.S. Patent No. 2,138,495, granted to A. J. Lewis on Nov. 29, 1938, find use as fasteners in mailing boxes, for example. Such fasteners, when applied along the edges of box walls, while useful in fastening covers on boxes, are ineffective in keeping the skirts or flanges of the covers which overlap the box walls snug against these walls. Occasionally, the cover skirts may catch on something, and if this happens, an inadvertent pull on the cover skirt is apt to tear the cover. This is especially true where the cover is made of thin, or relatively weak, sheet materials such as those in which flowers are packaged or those of which shoe boxes are customarily made, for example. It is therefore desirable to provide a fastener which will hold the cover skirt fairly snugly against the box walls so that the danger of accidental or inadvertent tearing of the cover will be minimized.

I have found that, by mounting the staple fasteners of the type mentioned above at locations on the box walls spaced from the edges thereof, this can be accomplished quite effectively. Moreover, there are other instances where I have found it useful to mount staples of the type under consideration on sheet members in spaced relation to the edges thereof. One such instance is a panel which is used as a backer in picture frames to facilitate mounting the frames, and another is a panel forming either a base or a back rest of a display rack, all as disclosed in my copending application, Ser. No. 10,771, filed Feb. 24, 1960 for "Mountings for Picture Frames or the Like."

The primary object of the present invention, therefore, is to provide improved apparatus for forming and applying to sheet members in spaced relation to the edges thereof wire staples of the general type mentioned above.

More particularly, it is an object of the present invention to provide, in apparatus of the type set forth, an improved mechanism for applying the staples to sheet material in spaced relation to the edges of the sheets and clinching the staples in place thereon to thereby securely affix the staples in place.

Another object of the present invention is to provide improved wire staple forming and applying apparatus as set forth above which will impose no strain upon the sheet member in effecting the securing of the staple thereto.

A further object of the present invention is to provide improved staple driving mechanism for driving a staple through sheet material, first in one direction, and then in the reverse direction.

In accomplishing the foregoing and other objects of the present invention, I make use of mechanism similar to that of my aforesaid Patent 2,896,214 for feeding in and cutting off desired lengths of wire from which the substantially U-shaped staples are formed in a horizontal plane. I also make use of mechanism similar to that disclosed in my aforesaid patent for initially bending the legs of each staple 90° relative to the plane of the body of the staple and for driving the bent legs down through a sheet member in one direction from one surface of the sheet member but at a location on the sheet member such that the staple, in its entirety, is spaced from all edges of the sheet member in contrast to applying the staple along an edge of the sheet as in the prior art, including my aforesaid patent. In accordance with the present invention, novel mechanism has been provided for then bending the end portion of each staple leg in proximity to its end to provide clinching parts therefor, and then bending the legs back along the opposite surface of the sheet member and driving the clinching parts thereof back through the sheet member from said opposite surface thereof in a direction opposite to the first mentioned direction. This brings the clinching parts of the legs above the first stated surface of the sheet member. The clinching parts of the legs are then bent over the leg portions which lie against the first mentioned surface of the sheet member and are clinched thereagainst over the staple legs to thus secure the staple to the sheet member.

Figure 2:
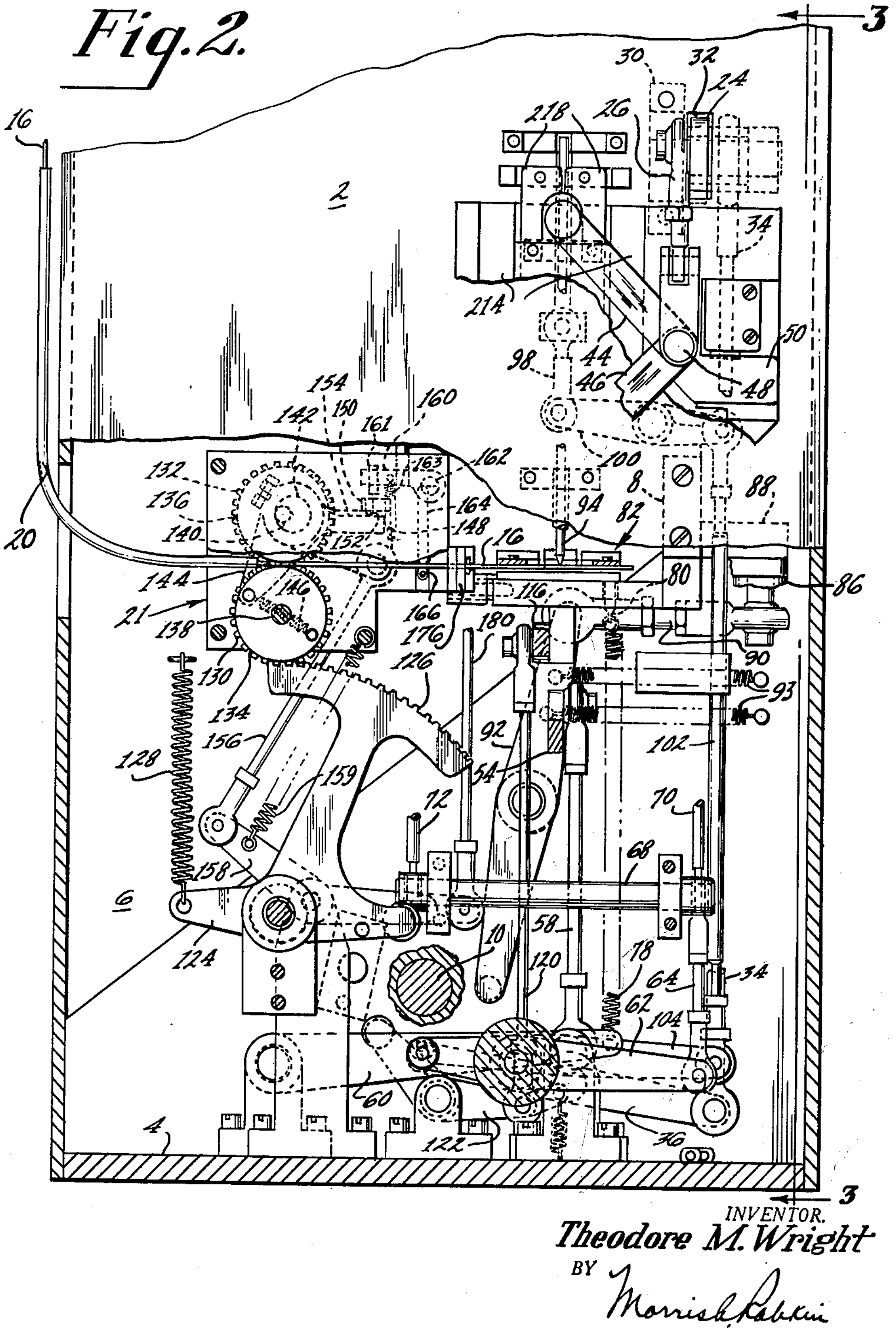
Figure 3:
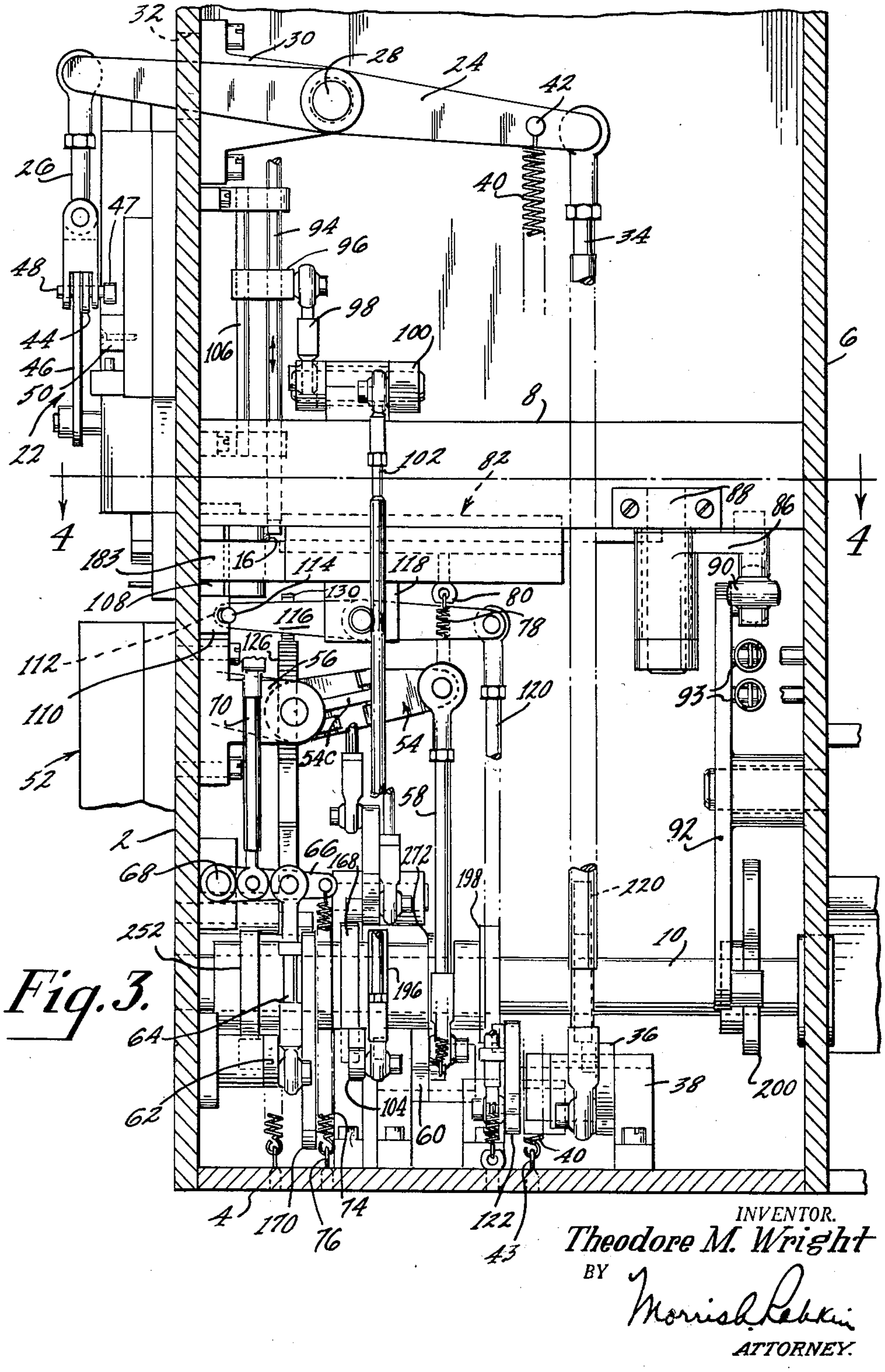
Figure 4:
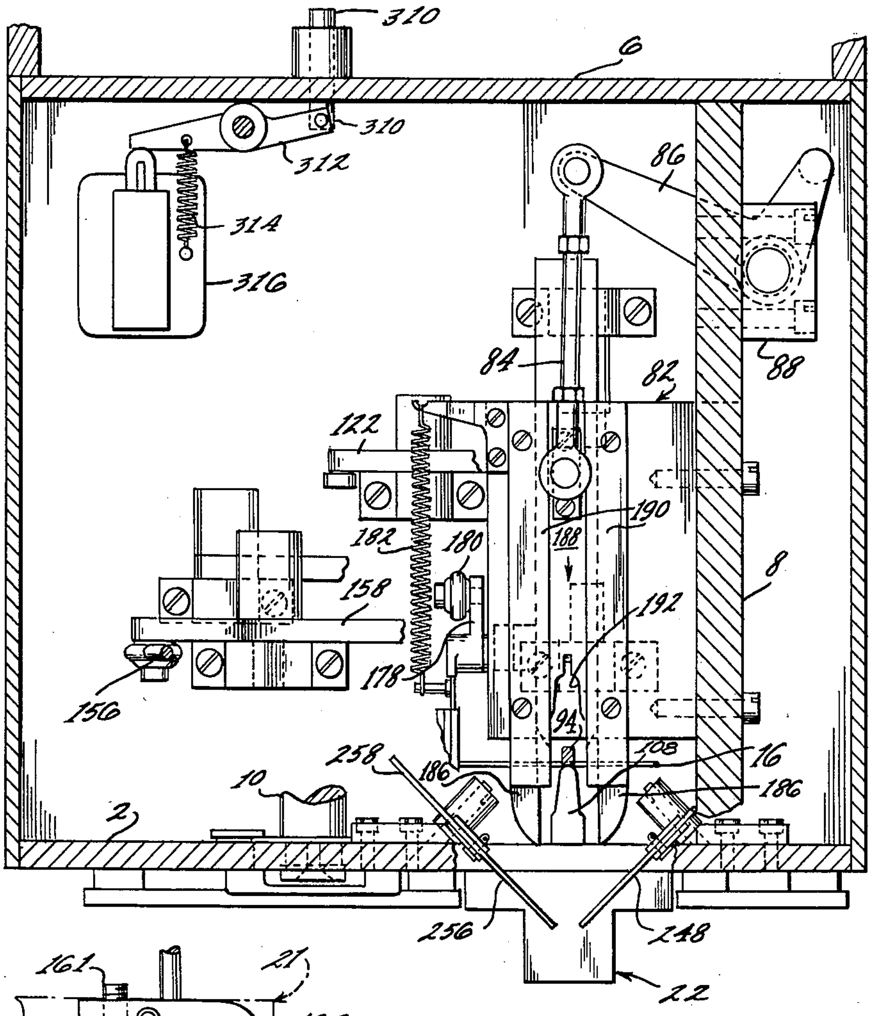
Figure 23:
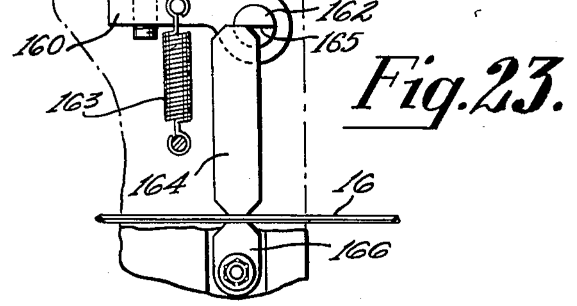
Figures 5, 6:
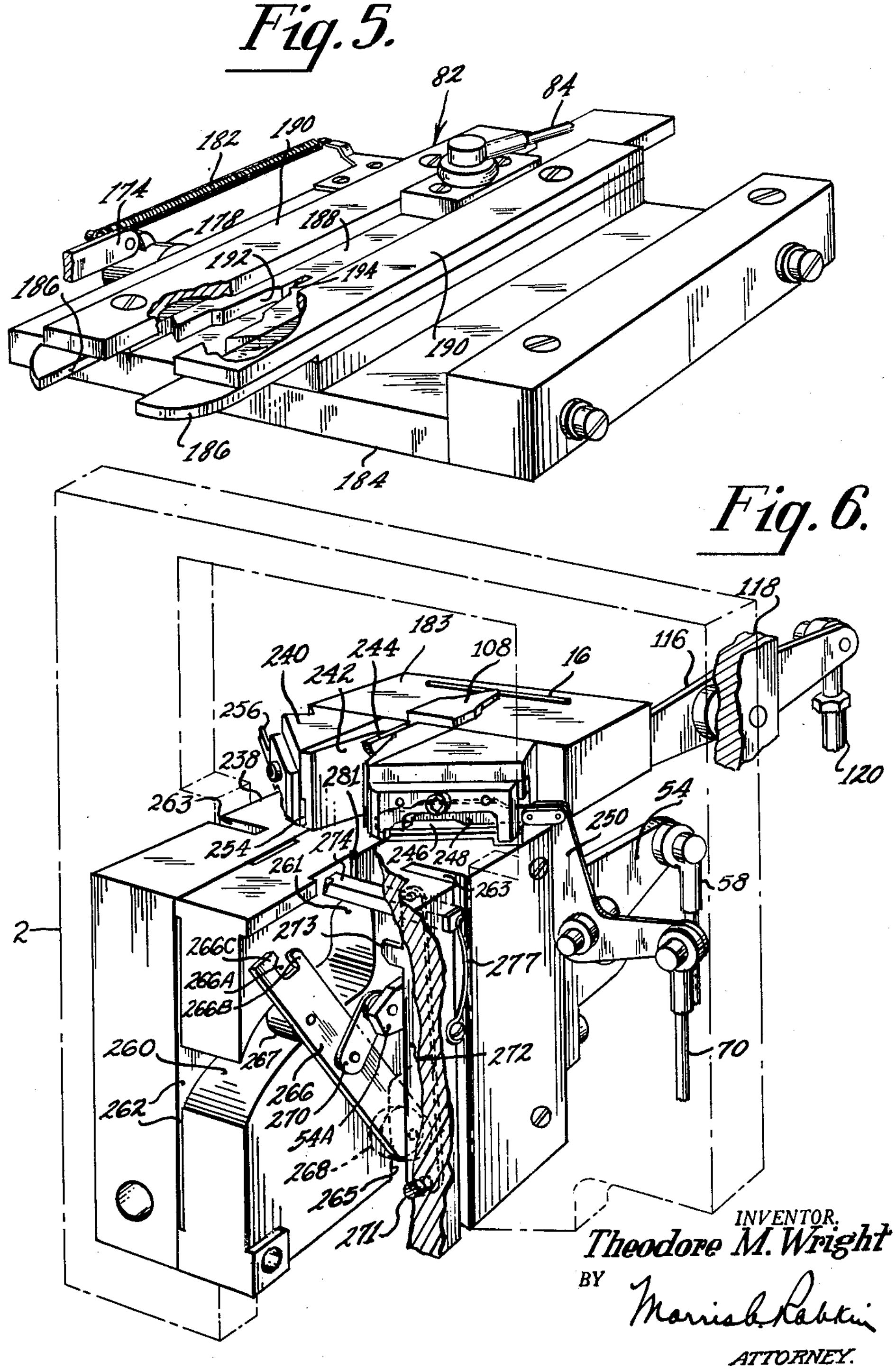
Figure 6A:
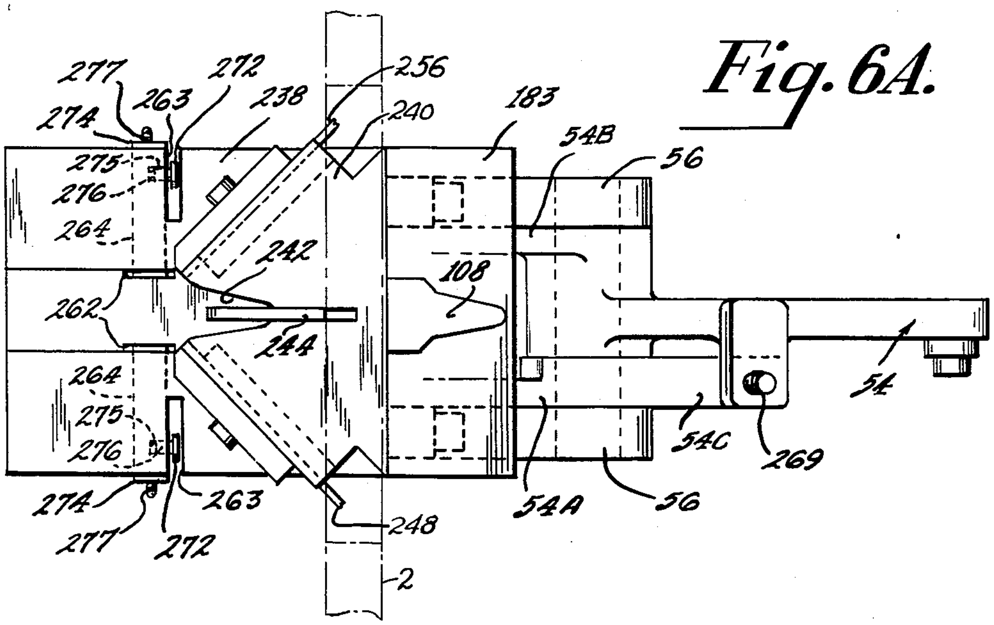
Figure 6B:
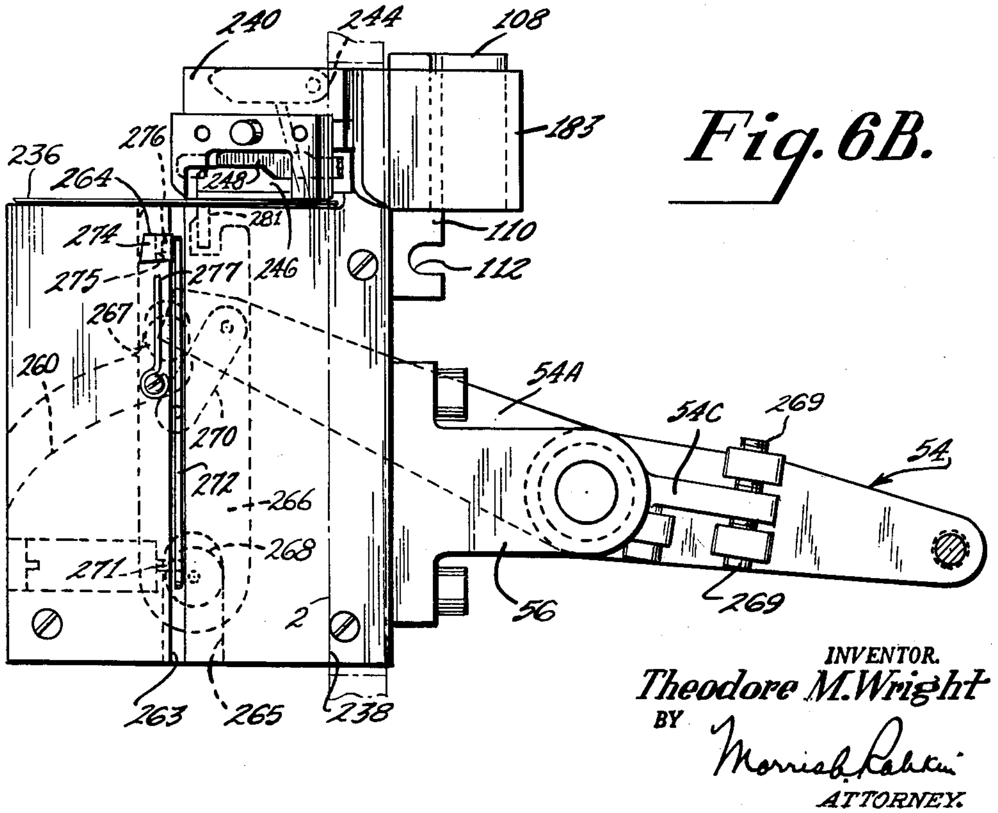
Figures 7, 8:
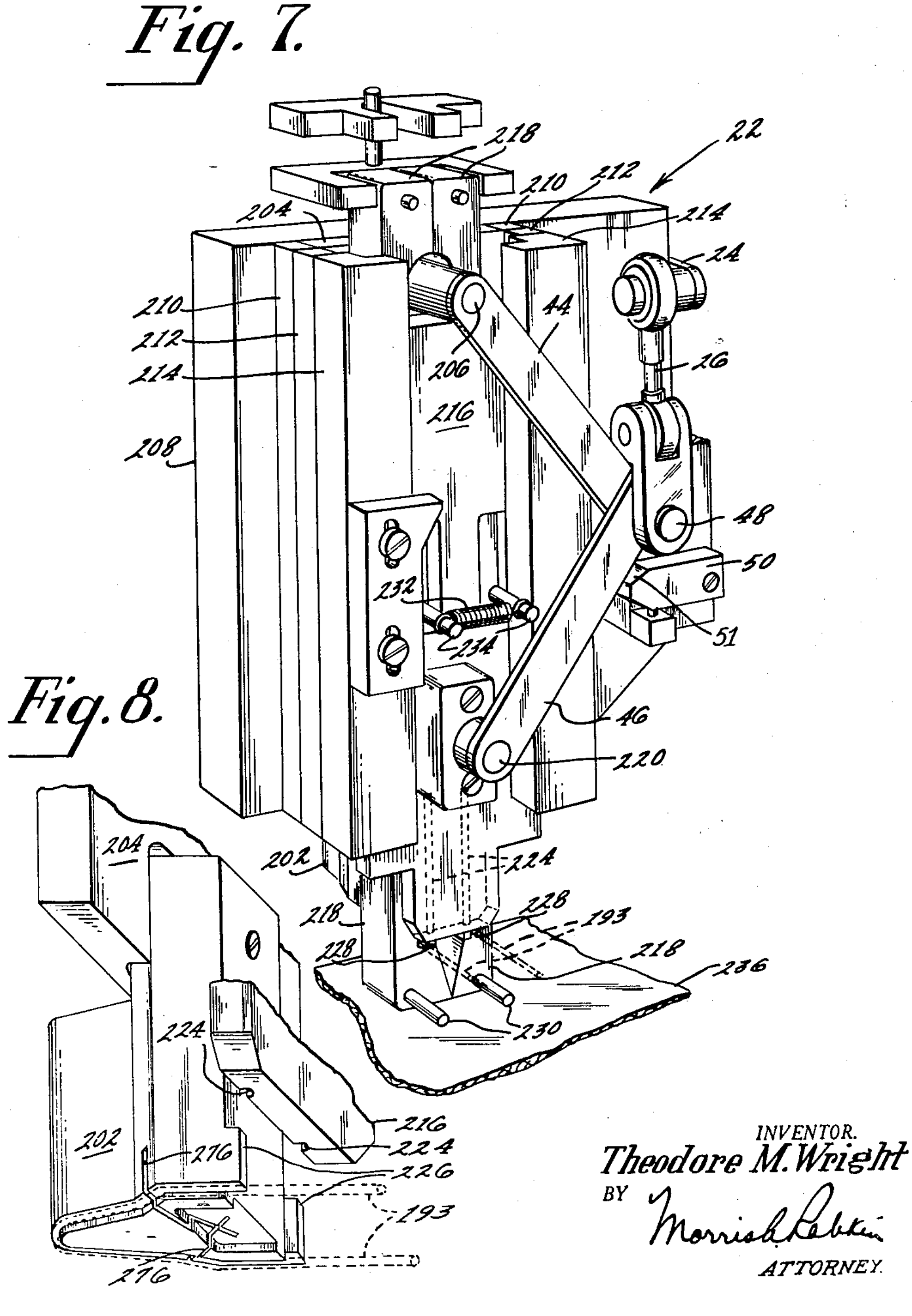
Figure 9:
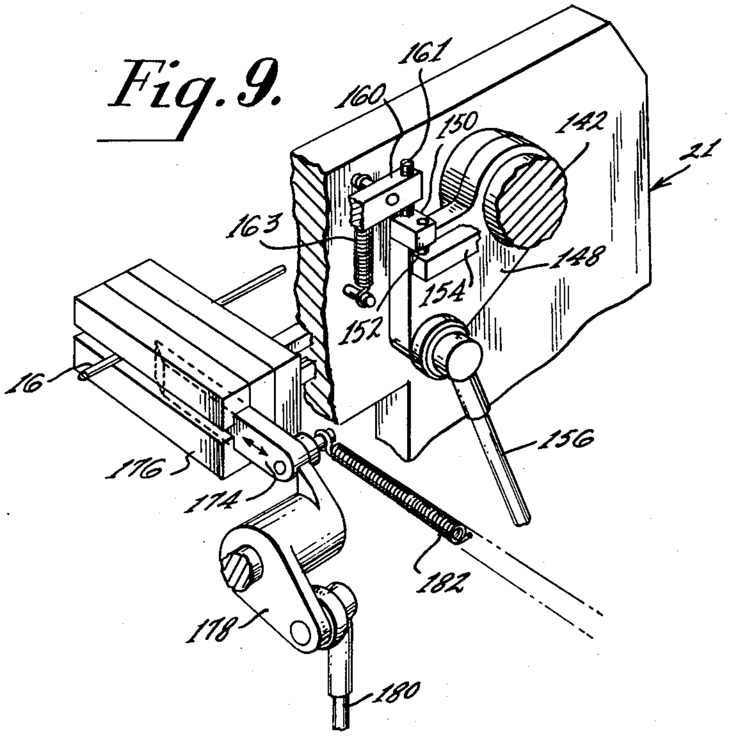
Figure 10:
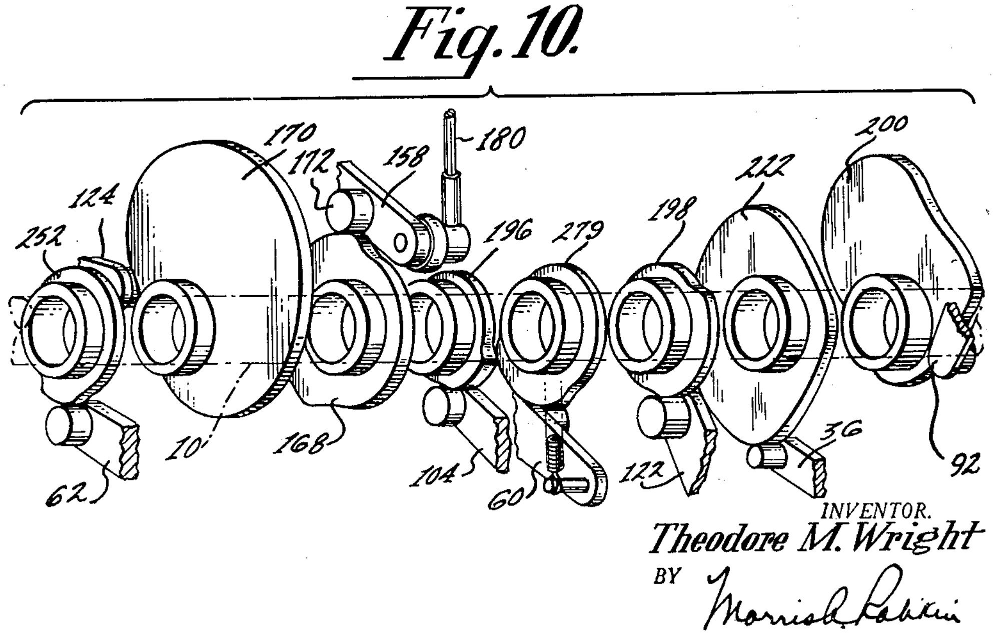
Figure 11:
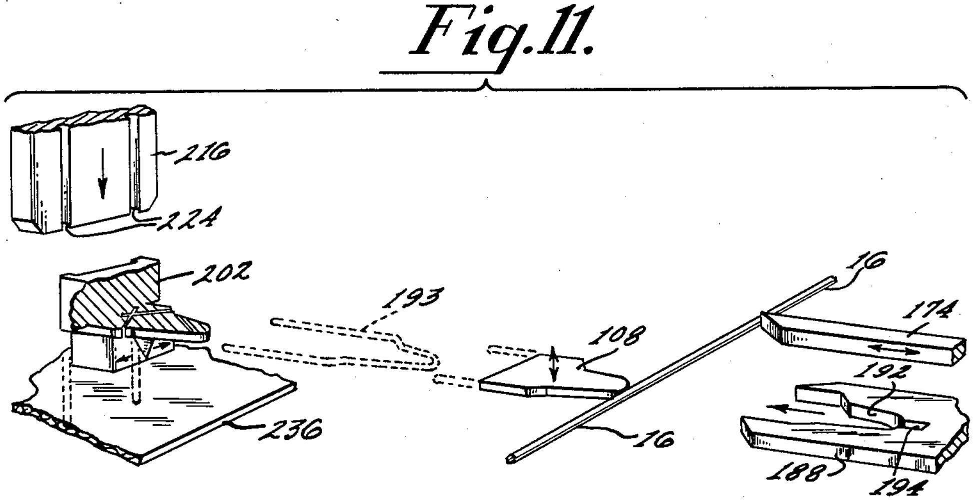
Figure 24:
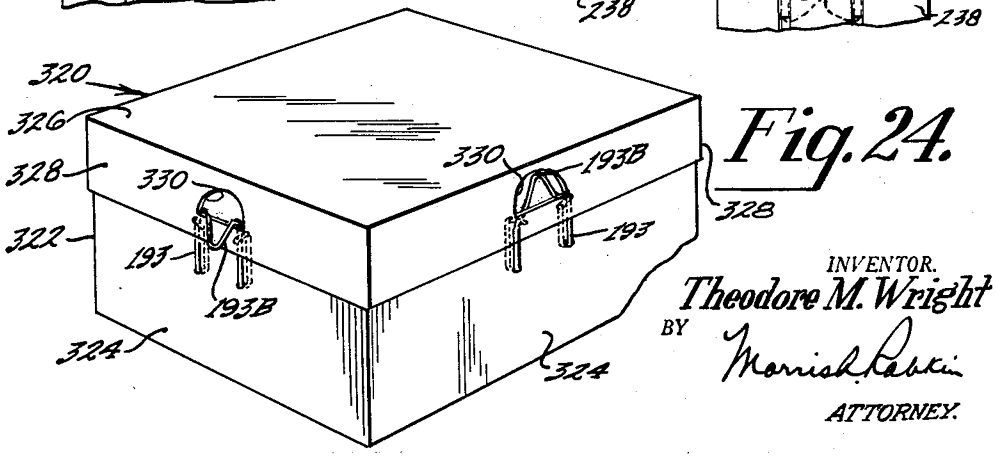
Figure 15:
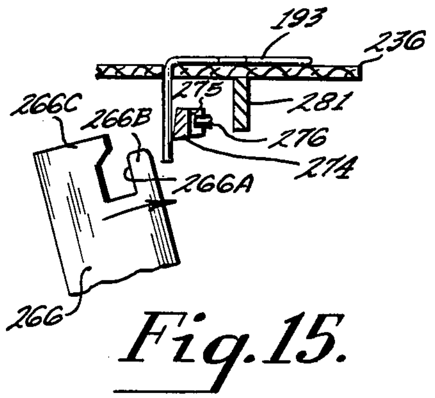
Figure 16:
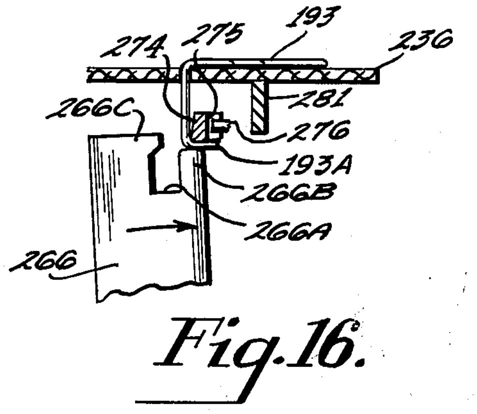
Figure 17:
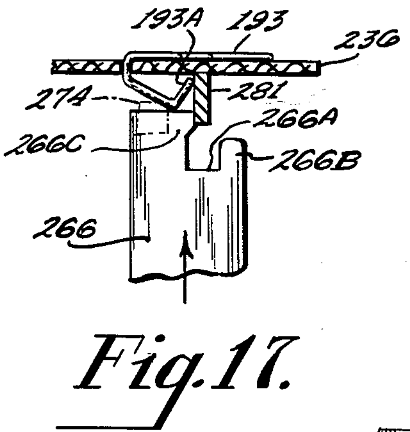
Figure 18:
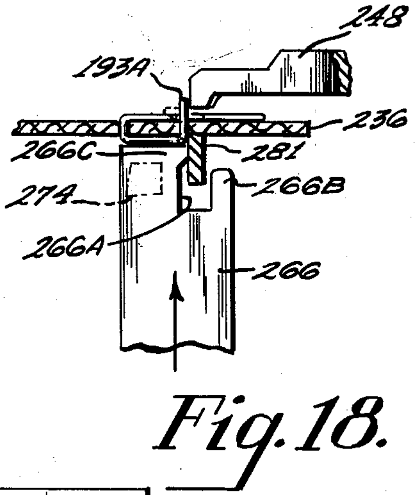
Figure 19:
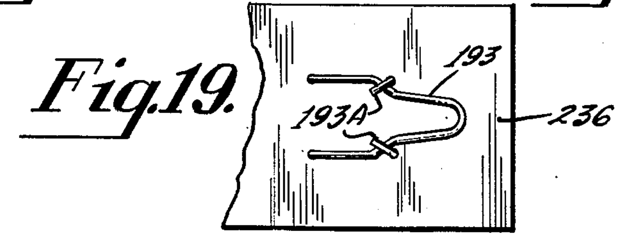
Figures 20, 21, 22:
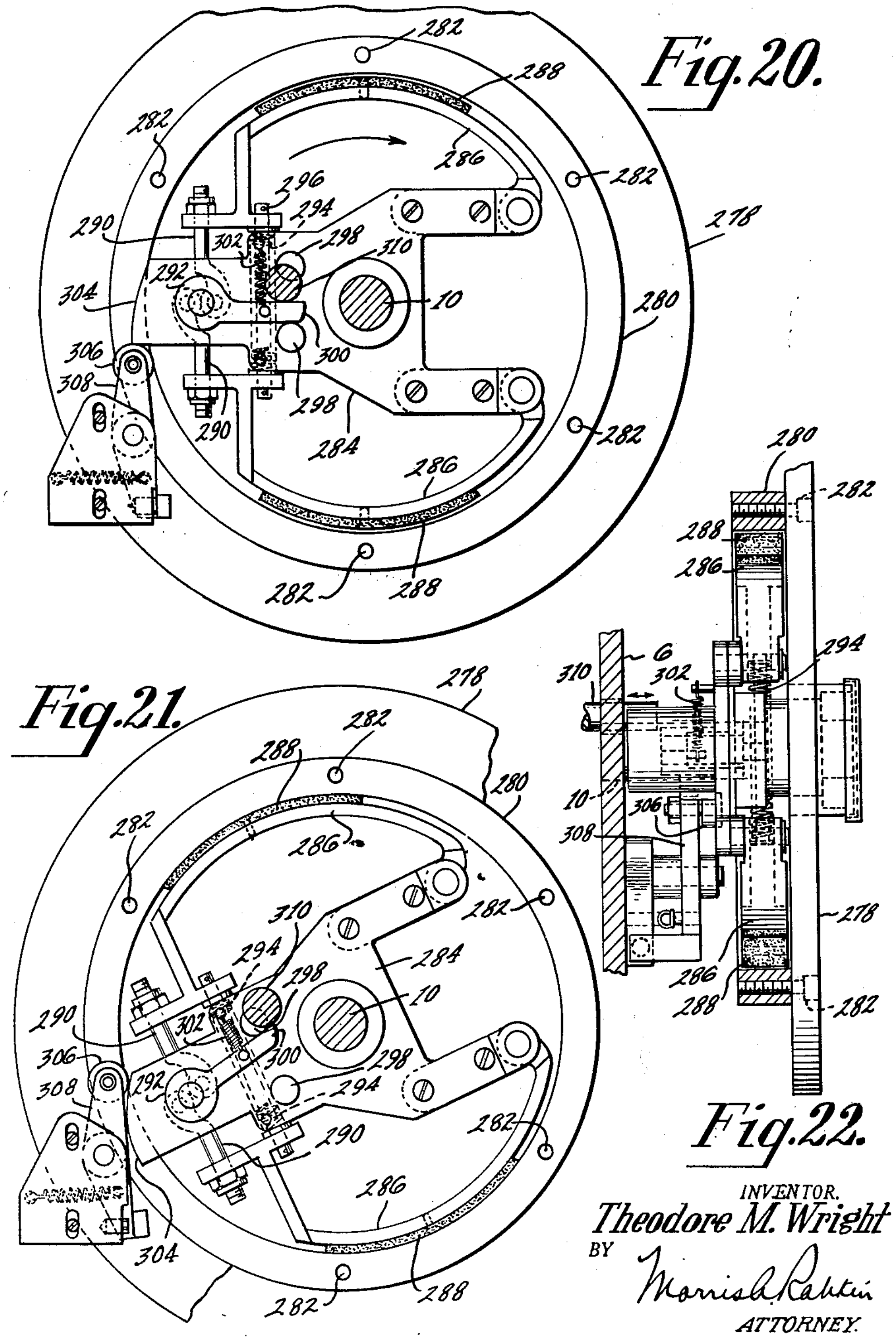

The invention itself, both as to its organization and method of operation, as well as additional objects and advantages thereof, will be understood more readily from the following description, when read in connection with the accompanying drawings, in which:

FIG. 1 is a perspective view, with one side panel open to show the interior mechanism, of one form of stapling machine constructed in accordance with the present invention, FIG. 2 is a front elevational view, partly in phantom and partly broken away, of the apparatus shown in FIG. 1, FIG. 3 is a sectional view taken along the line 3—3 of FIG. 2, and viewed in the direction of the appended arrows, FIG. 4 is a partial sectional view taken along the line 4—4 of FIG. 3 and viewed in the direction of the appended arrows, FIG. 5 is a perspective view of the staple-forming portion of the apparatus of FIG. 1, FIG. 6 is a perspective view of the staple clincher assembly of the apparatus of FIG. 1, FIGS. 6A and 6B are, respectively, a top plan view and a side elevation of the staple clincher assembly of FIG. 6, FIG. 7 is a perspective view of the staple holding and leg bending assembly, FIG. 8 is a detailed perspective view of the staple holding die of the assembly shown in FIG. 7, FIG. 9 is a detailed perspective view of the staple-wire cut-off mechanism, FIG. 10 is an exploded view of the cams which effect the operation of the apparatus of FIG. 1, FIG. 11 is a pictorial flow diagram illustrating the forming of the staple and its movement into engagement with the holding die shown in FIG. 8, FIGS. 12, 13 and 14 are detailed views, partly broken away and in section, illustrating the progressive steps of bending the legs of the staple and then driving the bent legs through a sheet member in one direction, FIGS. 15, 16, 17 and 18 are detailed views illustrating the progressive steps of further bending the staple legs, driving them back through the sheet member in the opposite direction, and finally clinching them to the sheet member, FIG. 19 is a view showing a completed clinched staple secured to a sheet member in spaced relation to the edges thereof, FIG. 20 is an elevational view of a once-around clutchbrake mechanism for driving the shaft carrying the cams of FIG. 10, the clutch being shown in the disengaged condition, FIG. 21 is a view similar to FIG. 20 but showing the clutch in its engaged condition, FIG. 22 is a side view of the clutch, FIG. 23 is an enlarged, detail view showing the wire clamping mecahnism, and FIG. 24 is a perspective view of an improved box structure provided with cover fastening staples according to the present invention.

Referring, now, to the drawings in more detail, there is shown, in FIGS. 1 to 3, a front mounting panel 2, a base member 4 and a rear mounting panel 6. Each of these members is made of suitable metal of sufficient thickness and strength to support, during operation, the several elements carried thereby. Extending between the front panel 2 and the rear panel 6 at an elevation somewhat above the center, there is a main brace and horizontal mounting bar 8. Also extending between the two panels 2 and 6, and journalled therein, is a main camshaft 10.

At the top of the front panel 2 is a bracket 12 which carries a supply spool 14 of wire 16 from which the staples are to be formed. A guide member 18 leads the wire from the spool 14 to a feed tube 20 which, in turn, leads the wire 16 to a wire feed mechanism 21 (FIG. 2), hereinafter described in greater detail.

Mounted on the upper half of the front surface of the front panel 2 is a staple holding and leg bending subassembly 22. This subassembly is shown in more detail in FIG. 7. The subassembly 22 is driven by a lever 24 which is coupled to the subassembly 22 by a connecting link 26. The lever 24 is pivotally mounted on a stud 28 carried by a supporting boss 30. The boss 30 is secured to the rear surface of the front panel 2. The lever 24 extends through a suitable opening 32 in the panel 2. The end of the lever 24 opposite from the link 26 is connected, by a second link 34, to a cam follower arm 36. The cam follower arm 36 is pivotally carried by a suitable stud extending from a boss 38. A tension spring 40, coupled between a stud 42 on the lever 24 and an anchor eye 43 in the base member 4, provides the necessary return force for the reset operation of the subassembly 22. The subassembly 22 includes two main moving members which will be described more fully hereinafter. These two moving members are coupled, respectively, to the driving link 26 by a pair of connecting links 44 and 46 and a pin 48 which extends through and couples together the links 44, 46 and 26. Selective operation of the two aforementioned moving members is effected through engagement of a cam follower 47, which projects rearwardly from the pin 48, and a cam member 50.

Below the subassembly 22, and extending through the front panel 2, is a staple clinching subassembly 52. This subassembly is shown in more detail in FIG. 6. Some of the moving parts of the subassembly 52 are operated by a first lever 54 which is shown in detail in FIGS. 6A, 6B. The lever 54 is pivotally carried by a boss 56 which is, in turn, mounted on the front panel 2. A link 58 couples the lever 54 to a cam follower arm 60. Others of the moving parts of the subassembly 52 are operated through a linkage including a cam follower arm 62, a link 64, a crank 66 on a rod 68, and a pair of coupling links 70 and 72. A tension spring 74, extending between the crank 66 and an anchor eye 76 on the base member 4, provides the necessary return force to reset that portion of this subassembly which is operated by the last mentioned linkage. A similar tension spring 78 is coupled between the follower arm 60 and an overhead anchor eye 80 and supplies the necessary restoring force for that portion of the subassembly operated by the lever 54.

Mounted on the side of and supported by the horizontal mounting bar 8 is a staple forming subassembly 82. This subassembly is shown in more detail in FIGS. 4 and 5. The moving parts of the subassembly 82 are operated by a link 84 coupled to one leg of a bell-crank 86 (see FIG. 4). The bell-crank 86 is supported on a boss 88 mounted on the mounting bar 8 and is driven through a link 90 coupled to a cam follower arm 92 (see FIGS. 2 and 3). The cam follower arm 92 is reset to its normal or rest position by a pair of springs 93 which connect it to a pair of fixed pins on the rear panel 6.

Associated with the staple forming subassembly 82 is a wire holding finger 94 (see FIGS. 2, 3 and 4). This finger 94 holds a severed length of wire in position to be formed into a staple by the staple forming mechanism. The finger 94 is moved into and out of operating position by a slide block 96 which is driven by a link 98 coupled to a crank lever 100. The crank lever is, in turn, coupled by a link 102 to a follower arm 104 (best seen in FIG. 1). The slide block 96 is guided in its motion by sliding engagement with a guide rod 106.

Constituting an intermediate mechanism, in that it is physically a part of the clinching subassembly 52 but operates in association with the staple forming subassembly 82, is a staple forming anvil 108 (see FIGS. 3, 4, 6 and 11). The anvil 108 is arranged for slight vertical movement for a purpose presently to be set forth. To accomplish this, the anvil 108 is provided with a depending leg 110 which is provided with a recess 112. A stud 114 carried by a lever 116 is nested within the recess 112. The lever 116 is pivotally mounted on a boss 118 and is coupled by a link 120 to a cam follower arm 122. Operation of this linkage provides a slight amount of vertical motion to the anvil.

As was previously mentioned, the wire 16 is fed through the feed tube 20 to a wire feed mechanism 21. This mechanism is shown in FIG. 2. A cam follower arm 124 carries a large sector gear 126. A biasing spring 128 provides the necessary restoring force for the sector gear 126 and its associated mechanism. The sector gear 126 is positioned to engage a first spur gear 130 which, in turn, engages a second spur gear 132. The spur gears 130 and 132 respectively carry smooth wheels 134 and 136 for rotation therewith. The diameter of the wheels 134, 136 is substantially equal to or slightly less than pitch diameter of the associated gears. The lowermost gear 130 is mounted on a fixed stud 138 for rotation about a fixed axis. The other gear 132, however, is mounted for rotation about a stud 140 the axis of which may be shifted slightly. The stud 140 is an eccentrically disposed extension from the end of a larger stud 142. The axis of rotation of this larger stud is fixed. A crank member 144 is keyed to impart a slight rotation to the stud 142, thereby slightly shifting the axis of the smaller stud 140.

The crank 144 is normally biased in a counterclockwise direction (as viewed in FIG. 2) by a spring 146. However, the crank 144 is constrained in a direction to oppose the biasing force by a pivoted plate member 148 having a lip 150 (see FIG. 9). The lip 150 carries an adjustable screw stop pin 152 which engages a tang 154 on the crank 144. The plate member 148 is pivotable about the axis of the stud 142 under the control of a link 156. The link 156 is connected to be driven by a cam follower arm 158 which is biased clockwise (as viewed in FIG. 2) by a spring 159.

Positioned above the lip 150 of the plate member 148 is a wire clamp actuating member 160. The member 160 also includes a tang which extends over the lip 150 and carries an adjustable screw stop pin 161 the lower end of which cooperates with the upper surface of the lip 150. The member 160 is biased by a spring 163 in a counterclockwise direction (as viewed in FIG. 23) about an axis defined by a pin 162. The rotational motion of the member 160, under the influence of the biasing spring 163, is limited by the engagement of the pin 161 with the upper surface of the lip 150. However, the pin 162, which determines the axis of rotation of the member 160, is keyed to rotate with the member 160. This pin 162 has an extension which has a flattened face 165 on the lower side. One side of the flattened face of the pin 162 engages a wire clamping rod 164. This rod 164 extends through a suitable opening in the base of the wire feed subassembly to rest upon the upper surface of the wire 16. A backing block 166 is positioned to engage the opposite side of the wire from the rod 164. When the member 160 is allowed to be rotated slightly in a counterclockwise direction (as viewed in FIGS. 2 and 23), the flattened face 165 of the pin 162 forces the rod 164 downwardly to clamp the wire 16 between the lower end of the rod 164 and the backing block 166.

Whenever the follower arm 158 is operated by its associated cam 168 (see FIG. 10), the plate member 148 is pushed upward by the link 156. A slight amount of "play" or lost motion is included in the movement of the lip 150 between the two tangs 154 and 160. The initial upward motion of the pin allows the crank 144 to rotate slightly under the influence of the spring 146. This causes a shift in the axis of the upper gear 132 and, hence, of the associated wheel 136. The direction of the shift in the axis of the wheel 136 is such as to bring the wheel 136 closer to the other wheel 134. The magnitude of the shift in the axis is limited by the length of the gear teeth on the two gears 130 and 132. The gear teeth never become completely disengaged. When the two wheels are shifted into closer proximity, the wire is clamped between them.

Further upward movement of the lip 150 brings it into engagement with the lower end of the screw pin 161 to produce a clockwise rotation of the clamp actuating member 160 as seen in FIGS. 2 and 23) against the force of its biasing spring. This clockwise rotation of the member 160 releases the pressure on the rod 164, thereby unclamping the wire at that point.

In the condition thus established, the arm 124 carrying the sector gear 126 may be actuated by its associated cam 170 (FIG. 10). Operation of this arm 124 causes the two spur gears 130, 132 with their associated wheels 134, 136 to be rotated. Since the wire 16 is pinched between the two wheels 134, 136, a rotation of the wheels causes the wire to be advanced. The excursion of the sector gear 126 and the diameters of the two wheels 134, 136 measures out a predetermined length of wire.

After the measured length of wire 16 has been advanced, the cam 168 reaches a contour, with respect to the cam follower 172 on the arm 158, which first allows the plate 148 to reestablish a clamping of the wire between the rod 164 and the backing block 166, and then to disengage the wheels 134 and 136 from the wire. However, simultaneously therewith, the arm 158 operates to also cause the measured length of wire to be cut off. For this purpose, a wire cutting knife 174 (FIG. 9) is slidingly mounted in a guide block 176. The knife 174 is driven forward to shear the wire by actuation of a bell-crank driver member 178. The bell-crank driver member 178 is coupled to the arm 158 by a link 180. This may be most clearly seen by reference to FIG. 9. A spring 182 applies the necessary restoring force to the knife.

At the time that the measured length of wire is cut off, that measured length is positioned across the staple forming subassembly 82, ready to be formed into a staple. In describing this operation, particular reference will be made to FIGS. 4, 5, 6 and 11.

It will be remembered that a staple forming anvil 108 was described as a part of the clinching subassembly 52 but designed to be functionally a part of the staple forming subassembly 82. This anvil 108 was described as being movable slightly in a vertical direction. This anvil member 108 is carried in a base block 183. The wire rests on the base block 183 adjacent the end of the anvil 108. The finger 94 is moved to its lowermost position and holds the severed length of wire 16 in the position just described.

The remainder of the staple forming subassembly includes a mounting bracket 184 by means of which the subassembly is secured to the mounting bar 8. It also includes a pair of side guide blocks 186, a slide member 188, and a pair of top guide plates 190. The slide member 188 is coupled to and driven by the link 84, in the manner described above. The forward end of the slide member 188 is provided with a notch 192 which is shaped complementarily to the anvil 108, that shape being the desired contour of the staple to be formed. In this case, the staple 193 will be given substantially a U-shaped configuration with a shoulder part way down each leg of the U. Upon being driven forward by the link 84, the slide member 188 engages the cut length of wire and bends it around the anvil 108. The forward motion the slide member 188 is continued until the wire is formed firmly between the outer surface of the anvil 108 and the complementary curve of the notch 192. The base of the notch is provided with a further recess 194 to accommodate the end of the finger 94 which continues to hold the wire until the staple 193 is completely formed.

When the staple 193 has been completely formed, as just described, the finger 94 is retracted by operation of its operating cam 196 in cooperation with its associated follower arm 104. At the same time, the anvil 108 is retracted or lowered below the surface of the base block 183 by the cooperative action of the follower arm 122 with its associated cam 198. During the time that the finger 94 is being raised and the anvil 108 is being lowered, the cam follower arm 92 encounters a momentary dwell on the surface of its driving cam 200. After the finger 94 and the anvil 108 have been retracted, the cam 200 again rises, thereby continuing the forward motion of the slide member 188. The slide member 188 then carries the newly formed staple 193 forward to the staple holding and leg bending subassembly 22.

Feference is now made to FIGS. 7, 8 and 12 to 14. The subassembly 22 includes a staple holding block 202 (shown most clearly in FIG. 8) secured to a rear slide plate 204. This constitutes one of the two main moving members to which previous reference was made. The rear slide plate 204 is coupled, through a stud 206, to the previously mentioned link 44. The rear slide plate 204 is held on a submounting plate 208 by a pair of side guide bars 210. A pair of spacer bars 212 are positioned in front of the bars 210 and are, in turn, overlaid by a pair of front guide bars 214. A front slide plate 216 is positioned for operation in the recess defined by the two front guide bars 214.

Figure 12:
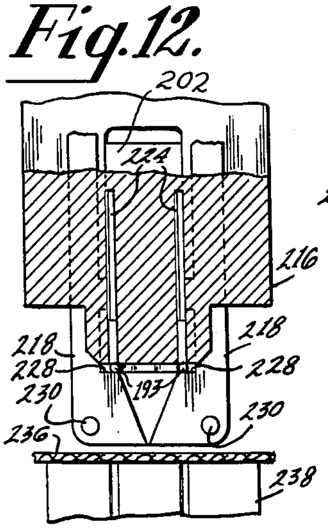
Figure 13:
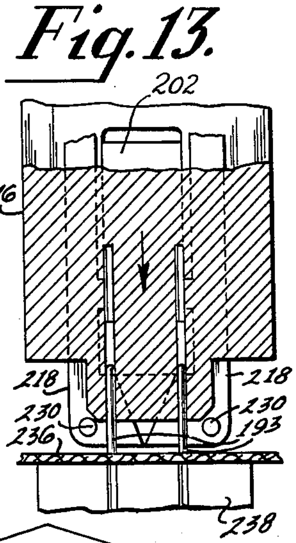
Figure 14:
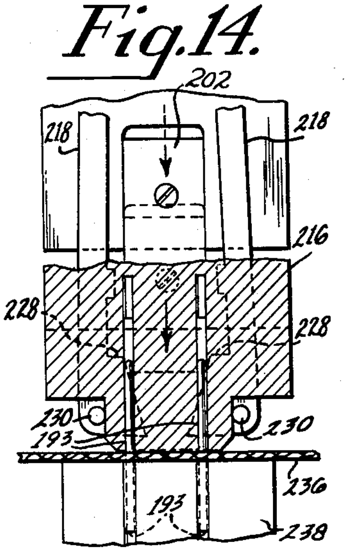

Between the front slide plate 216 and the rear slide plate 204 there is positioned a pair of separable jaw members 218. The lower ends of the jaw members 218 embrace the lower end of the staple holding block 202, as seen in FIGS. 12, 13 and 14. The front slide plate 216 is coupled, through a stud 220, to the aforementioned link 46. The staple holding block 202 is contoured to conform to the shape of the staple 193. The lower end of the staple holding block 202 is undercut by an amount just sufficient to embrace the staple 193 as the slide member 188 of the staple forming subassembly 82 pushes the staple forward. When the staple 193 is thus moved forward and seated around the undercut shoulder of the block 202, the ends of the legs of the staple extend beyond the front edge of the block 202 as shown in phantom in FIG. 8.

As previously mentioned, the lower ends of the jaw members 218 embrace the end of the block 202. As may be seen in FIG. 12, this arrangement leaves a small horizontal opening through which each leg of the staple 193 may protrude. The body of the staple is firmly held between the block 202 and the jaws 218. In this condition, a cam 222 on the sam shaft 10 causes the cam follower arm 36 to be moved in a direction to start the link 26 in its downward motion through the associated interconnecting linkage. It will be recalled that a pin 48 extends through the lower end of the link 26 and through the links 44 and 46 to terminate in a cam follower 47 (FIG. 3). The cam follower on the pin 48 engages a first cam surface 51 on the cam 50. The angle of the first cam surface 51 is such that it is substantially normal to a line drawn from that surface to the stud 206 which connects the link 44 to the rear slide plate 204. The initial downward motion of the link 26 then causes no corresponding motion of the rear slide plate 204. However, substantially all of the initial downward motion of the link 26 is transferred to the front slide plate 216 through the link 46 and its connecting stud 220.

The rear surface of the front slide plate 216 is provided with a pair of parallel channels 224 which are aligned with and are of a dimension to receive the ends of the legs of the staple 193. In FIG. 8, it may be seen that the forward surface of the block 202 has a pair of guide projections 226. These projections 226 also fit within the channels 224 and serve to assure proper alignment of the front slide plate 216 with respect to the staple.

As the front slide plate 216 is driven downward by the operation of the link 26, the lower end thereof engages the extending legs of the staple, bending them downward over the edge of the embracing ends of the jaw members 218 (see FIG. 13). Thus, the ends of the legs of the staple are bent at right angles to the main body or loop portion of the staple. As the front slide plate continues its downward motion, the bent legs of the staple are enclosed in and supported by the channels 224 on three sides and by the faces of the jaw members 218 on the fourth side.

It will be understood that the lower ends of the jaw members 218 meet at the extreme ends, then taper away from each other to about the place where the wire of the staple 193 is engaged. There, a small horizontal step 228 is formed. It is over this step 228 that the legs of the staple are bent downward. It will also be noted that the lower end of the front side plate 216 has bevelled corners. As the front side plate 216 continues its downward movement, the bevelled corners engage a pair of pins 230 which protrude from the front face of the jaw members 218. This engagement causes the jaw members to be separated somewhat against the force of a spring 232 which acts on a pair of studs 234 to normally bias the two jaw members 218 together.

As the jaw members 218 are separated, the steps 228 are moved out from under the legs of the staple 193, as shown in FIG. 14. At this point, the cam follower on the pin 48 will have reached the end of the first cam surface on the cam 50. The second surface on the cam 50 permits a small simultaneous movement of both the front slide plate 216 and the rear slide plate 204. This small movement places the lower end of the front slide plate 216 and the ends of the bent legs of the staple 193 in engagement with the surface of a sheet member 236 to which the staple is to be attached in spaced relation to all the edges of the sheet member, the sheet member being properly gauged by any suitable means.

The link 26 then continues its downward movement. This continued movement brings the cam follower on the pin 48 into engagement with a third surface on the cam 50. This surface is perpendicular to a line drawn from that surface to the center of the stud 220 on the front slide member 216. Since the front slide member has reached the limit of its downward movement, the continued movement of the link 26 is substantially all transferred to the rear slide plate 204. This motion results in a corresponding downward motion of the staple holding block 202. The motion of the block 202 forces the ends of the staple through the sheet member 236. It will be remembered that the bent ends of the staple legs were enbraced by the closely fitting walls of the channels 224. The open face of the channels 224 is closed by the tapered ends of the jaw members 218.

Thus, the ends of the legs are completely supported during the initial descent of the block 202. Accordingly, considerable pressure may be applied to force the ends of the staple through the sheet member 236 without the likelihood of having the legs buckle. The complete downward stroke of the block 202 firmly sets the loop or the body portion of the staple in contact with the upper surface of the sheet member 236 with the full length of the bent legs extending through and below the sheet, as shown in dotted lines in FIG. 14.

Particular reference is now made to FIGS. 6, 6A, 6B, and 15 to 19. FIGS. 6, 6A and 6B show some of the details of the structure of the staple clinching assembly 52. On a base guide block 238, there is positioned an upper guide block 240. Adjacent the guide block 240 may be seen the base block 183 which carries the anvil 108. The guide block 240 is provided with a centrally positioned recess 242 which is contoured to match the contour of the staple holding block 202 of the subassembly 22. A spring biased staple ejector 244 extends into the recess 242. A guide channel 246 in the block 240 houses and guides a first clincher arm 248. The clincher arm 248 moves in a vertical plane which makes an angle of about 45° with front panel 2. It is operated by a bell crank 250 which is coupled to the link 70. This link is connected through the previously described rod 68 and associated crank 66 and link 64 to the cam follower arm 62. A cam 252 on the cam shaft 10 drives the arm 62.

A guide channel 254 similar to the guide channel 246 but on the opposite side of the block 240 from the channel 246 houses and guides a second clincher arm 256 similar to the clincher arm 248 (see FIG. 4). This second clincher arm 256 is also coupled, through a bell crank 258, to its driving link 72.

The base guide block 238 is formed with a cam track having a gradually rising arcuate portion 260 which terminates in an abruptly rising vertical portion 261. The guide block 238 also has a pair of parallel front guide slots 262 which also extend, in part, through the top of the block, a pair of transversely aligned guide slots 263, a pair of transversely aligned guide grooves 264 near its upper end, and, at its lower end, a transversely extending guide slot 265. In each guide slot 262 is a movable blade 266 for completing formation of the staples and driving the staples back through the sheet member 236. Each blade 266 has a roller 267 which rides along the cam track 260, 261, and a second roller 268 which rides in the slot 265.

The lever 54 has a pair of forwardly extending arms 54A and 54B, the former of which is rotatable relative to the latter to permit adjustment of these arms relative to each other on a common axis. A rearward extension 54C on the arm 54A can be locked between a pair of adjustable locking screws 269 carried by the arm 54 to thereby lock the arm 54A in desired relation to the arm 54B. The forward ends of the respective arms 54A and 54B extend each into a separate one of the guide slots 262 from the rear. Each arm is connected by a link 270 to one of the blades 266. Adjustment of the arms 54A and 54B relative to each other is desirable to insure proper relation between these arms and their respective blades 266.

Pivotally carried in each of the slots 263 on a pin 271 is an anvil actuating lever 272 having a laterally inwardly inwardly extending arm 273 (see FIG. 6) formed with an inclined, lower edge portion to constitute a cam for a purpose shortly to be set forth. Each guide groove 264 movably carries a slidable anvil 274 having a recess 275 therein near its outer end for reception of a pin 276 carried by the adjacent lever 272 near its upper end. The anvils 274 are normally biased inwardly, or toward each other, by respectively associated springs 277 mounted on the block 238 so as to be in position to be engaged by the downwardly extending portions of the staple legs which were driven through the sheet member 236 in a downward direction as described above.

When the staple holding block 202 is moved downward, it fits snugly into the recess 242 in the upper guide block 240 and continues its downward movement until the staple 193 is held embraced on two sides by the undercut end of the block 202, on a third side by the walls of the recess 242, and on the fourth side by the upper surface of the sheet member 236 which rests on the block 238. With the body of the staple thus securely held, a cam 279 on the cam shaft 10 starts the forward ends of the levers 54A and 54B moving in an upward direction. Acting through their respective links 270, the arms 54A and 54B thereupon cause the rollers 267 to ride up along the arcuate cam portion 260 to thereby initiate upward and rearward arcuate movement of the blades 266, as indicated by the curved arrow in FIG. 15.

Each blade 266 has a slot 266A near its upper end shaped to provide a vertically extending bending finger 266B which falls short of the upper end of the blade, and a transversely extending bending finger 266C at the very upper end thereof. When the staple legs are first driven down through the sheet member 236 to the dotted line position of FIG. 14, which corresponds to the position of FIG. 15, the downwardly extending legs occupy a position each immediately in front of one of the anvils 274. At this point, the staple legs extend slightly beyond the anvils 274, as clearly seen in FIG. 15. The blades 266 move in the manner shown by the arrow in FIG. 15, and their leading fingers 266B engage the protruding parts of the staple legs below the anvils 274 and bend them approximately 90° around these anvils to provide staple clinching parts 193A. Immediately thereafter, the rising, forward ends of the arms 54A and 54B engage the inclined cam edges of the arms 273 of the levers 272 to cam the levers 272 outwardly. The pins 276 then slide the anvils 274 outwardly against the forces of their respective springs 277 and thus remove the anvils from the staple legs.

The blades 266 continue their advance as their rollers 267 approach the vertical cam track portion 261, their respective fingers 266C thereupon engaging the staple legs to now reverse bend them 90° back toward the sheet member 236. This action proceeds until the fingers 266C are close to a guide plate 281. By this time, the rollers 267 have reached the vertical cam track portion 261 and the blades 266 are thereupon given a vertical thrust upwardly (as shown by the vertical arrows in FIGS. 17 and 19) to drive the reversely bent staple legs up against the lower surface of the sheet member 236 and their clinching parts 193A up through the sheet member at points just beyond, but in proximity to, the shoulders of the respective legs of the staple, as seen from FIG. 18. The guide plate 281 guides the clinching parts 193A through the sheet member 236 in a direction normal to the sheet member. The clincher arms 248 and 256 are then advanced to force the leg parts 193A down over the staple legs, preferably over the aforementioned shoulders thereof, and clinch them against the upper surface of the sheet member, thus securing the staple in place spaced from all edges of the sheet member, as seen in FIG. 19. When the ends of the staple 193 have thus been clinched, the staple holding block moves upwardly to release the staple. The spring biased ejector 244 then pushes the staple out of the recess 242.

All of the foregoing steps and operations are carried out through the cooperative action of the several cams on the cam shaft 10 and the associated cam followers. One revolution of the cam shaft 10, carrying the several cams with it, is sufficient to carry out, in sequence, all of the steps and operations heretofore described. In order to assure a reliable once-around or single revolution operation of the cam shaft 10, with proper indexing at the end of each revolution, there is provided a single revolution type clutch. This clutch is shown in FIGS. 20, 21 and 22, and is disclosed and claimed in my copending application, Ser. No. 652,588, filed April 12, 1957, now Patent No. 2,969,861, granted January 31, 1961.

A flywheel 278 is coupled to a suitable motor (not shown). A clutch drum 280 is secured to the face of the flywheel 278 by suitable bolts 282. The camshaft 10 extends through the rear panel 6 and into coaxial alignment with the clutch drum 280. The end of the shaft 10 carries a clutch yoke 284. Pivotally secured to the yoke 284 at one end is a pair of clutch shoes 286 with suitable linings 288 thereon. The other end of each of the shoe members 286 is coupled to the opposite end of the yoke 284 by an eccentric toggle arrangement which includes a pair of toggle links 290 eccentrically mounted on a toggle key 292. The toggle key 292 is pivotally mounted on the yoke 284. The toggle ends of the two shoe members 286 are normally biased apart by a main clutch spring 294. The spring 294 surrounds a guide pin 296 which extends through end portions on the shoe members 286. A pair of studs 298 extend out from the face of the yoke 284 and are positioned to limit the rotational movement of the toggle key 292 by engagement with an arm 300 which extends from the hub of the toggle key. A spring 302 is coupled to the arm 300 of the toggle key 292 and biases that key in a direction to augment the separating force applied to the shoes 286 by the spring 294.

The end of the yoke 284 adjacent to the toggle constitutes a cam surface 304 which engages an indexing roller 306 carried by a spring biased arm 308 positioned adjacent to the clutch. A clutch pin 310 extends through the rear panel 6 (see FIGS. 4 and 22) and engages the arm 300 of the toggle key 292. The pin 310 is retractable from engagement with the arm 300 by operation of a lever 312 which is biased by a spring 314 and actuated by a solenoid motor 316.

In the idle condition, as shown in FIG. 20, the flywheel 278, with the clutch drum 280, is continuously rotated by the driving motor. The clutch shoes 286 are held out of engagement with the drum 280 by operation of the toggle arrangement. The arm 300 on the toggle key 292 is held in position to cause disengagement of the shoes 286 by the clutch pin 310. With the clutch pin extended, as in FIG. 20, the arm 300 of the toggle key is held securely between the clutch pin 310 and the lowermost of the studs 298. The clutch yoke 284 is prevented from moving in a reverse direction by the indexing roller 306 which engages the yoke 284 adjacent the cam surface 304.

When the solenoid motor 316 is energized by operation of a suitable switch (not shown), the lever 312 is operated to retract the clutch pin 310. When the pin 310 is retracted, the arm 300 of the toggle key 292 is pulled by the spring 302 to shift the toggle bolts 290 and thus allow the spring 294 to move the shoes 286 into driving engagement with the drum 280. The upward movement of the arm 300, as viewed in FIG. 20, is limited by the uppermost one of the studs 298. When the shoes 286 are moved into engagement with the drum 280, the yoke 284 is rotated, carrying the shaft 10 with it. By the time, the yoke 284 nears the completion of one revolution, the pin 310 will have been returned to its normal or rest position. The arm 300 of the toggle key 292 thereupon comes into contact with the side of the pin 310. The inertia of the clutch carries the mechanism with at least enough force to cause the coaction of the arm 300 and the pin 310 to overcome the force of the spring 302 and the spring 294 to disengage the shoes 286 from the drum 280. At about the same time that the arm 300 comes into contact with the pin 310, the roller 306 engages the cam surface 304 of the yoke 284. As the roller 306 moves outward on the cam surface, the spring bias on the roller arm 308 adds a further decelerating force to the yoke 284. The position of the roller 306 is made adjustable so that it drops over the edge of the cam surface 304 at the instant that the arm 300 is locked between the pin 310 and the stud 298. This arrangement positively locks and indexes the yoke 284 and, hence, the cam shaft 10 in rest position, ready to start another cycle whenever the pin 301 is retracted.

There has thus been provided an improved apparatus for forming and applying to sheet members, in spaced relation to the edges thereof, wire staples useful for a variety of purposes, such as those previously set forth. One such use is in an improved box structure shown in FIG. 24. By way of illustration, there is shown a rectangular box 320 comprising a container 322 having an open top and walls 324, and a closure or cover 326 having a depending flange or skirt 328 adapted to lie against the walls 324 when the cover is applied over the open top of the container. To each of the walls 324, there may be affixed below the top edge thereof, in the manner described above, one or more staples 193, one staple being shown on two of the walls merely by way of illustration. The skirt 328 has a corresponding number of openings 330 therein in alignment with the loops 193B of the staples, the lower edges of the openings 330 being preferably fairly close to the lower edge of the skirt. After the cover 326 is applied to the container, the loops 193B are reversely bent away from the walls 324 and through their aligned openings 330 through 180° and into pressing engagement with the skirt 328. The loops 193B will then hold the skirt snugly against the walls 324. Thus, the danger of having something catch in between the skirt 328 and the walls 324 and pull the skirt away from the walls to possibly tear it is greatly minimized. Moreover, since the loops 193B do not extend beyond the upper edges of the walls 324, as in prior art mailing boxes, for example, there are no projecting loops to contend with when the boxes are stacked on each other, as for storage, shipping, or the like. Thus, a considerable saving in storage space can be effected with the improved box structures described.

From the foregoing description, it will be apparent that I have provided improved apparatus for forming and applying staples to sheet members in fully spaced relation to all the edges of such members, and with attendant advantages, as well as an improved box structure which utilizes staples so applied to advantage. While there has been described only one form of improved apparatus and one form of improved box structure, it will, no doubt, be apparent that many other forms of both are possible within the spirit of my invention. Hence, I desire that the foregoing shall be taken merely as illustrative and not in a limiting sense.

I claim as my invention:

1. A wire staple fastener apparatus comprising means for driving the end portions of a length of wire through a sheet member in one direction from one surface thereof and for applying an intermediate portion of said wire between said end portions thereof against said surface, means for thereafter reversely bending said end portions toward the opposite surface of said sheet member and into overlapping relation with said intermediate portion of said wire, means including guide means for then causing a part of each of said end portions to be driven back through said sheet member in a direction opposite to said one direction to thereby dispose said parts beyond said one surface of said sheet member, and means for thereafter clinching said end portion parts against said one surface to thereby secure the staple to said sheet member.

2. A wire staple fastener apparatus comprising means for driving the end portions of a length of wire through a sheet member in one direction from one surface thereof and for applying an intermediate portion of said wire between said end portions thereof against said surface, means for thereafter reversely bending said end portions toward the opposite surface of said sheet member, means including guide means for then causing a part of each of said end portions to be driven back through said sheet member in a direction opposite to said one direction to thereby dispose said parts beyond said one surface of said sheet member, and means for thereafter clinching said end portion parts over said intermediate portion of said wire and against said one surface to thereby secure the staple to said sheet member.

3. A wire staple fastener apparatus for fastening to a sheet member a staple comprising a length of wire having a pair of legs and an intermediate portion between said legs, said apparatus comprising means for driving at least portions of said legs through the sheet member in one direction from one surface thereof and for applying said intermediate portion against said surface, means for then bending each of said leg portions in proximity to their ends to provide clinching parts thereon, means for thereafter reversely bending said leg portions toward the opposite surface of said sheet member, means including guide means engageable by said clinching parts and cooperable with said last named means for causing said clinching parts to be driven back through said sheet member in a direction opposite to said one direction to thereby dispose said clinching parts beyond said one surface of said sheet member, and means for thereafter clinching said clinching parts over said intermediate portion and against said one surface to thereby secure the staple to said sheet member.

4. A wire staple fastener apparatus comprising means for forming from wire a reversely-bent staple having a loop portion and a pair of legs, means for holding said loop portion and bending an end portion of each of said legs to a plane angularly related to said loop portion, means for confining said legs to maintain them relatively rigid and for driving said leg end portions through a sheet member in one direction from one surface thereof at a location such that said staple is spaced from the edges of said sheet member and while said legs are so confined, means for then bending said leg end portions in proximity to their ends to provide clinching parts thereon, means for thereafter bending said leg end portions back toward said loop portion along straight paths snugly up against the opposite surface of said sheet member, means including guide means engageable by said clinching parts and cooperable with said last named means as said last named means bends said leg end portions up against said opposite surface of said sheet member for causing said clinching parts to be driven back through said sheet member in a direction opposite to said one direction to thereby disposed said clinching parts beyond said one surface of said sheet member, and means for thereafter clinching said clinching parts over said legs and against said one surface to thereby secure said staple to said sheet member.

5. A wire staple fastener apparatus comprising means for forming from a length of wire a reversely-bent staple having a loop portion and a pair of legs, means for holding said loop portion and bending an end portion of each of said legs to a plane at right angles to the plane of said loop portion, means for embracing and supporting said legs and for driving said leg end portions through a sheet member in one direction from one surface thereof at a location such that said staple is spaced from the edges of said sheet member, further means for holding said loop portion during subsequent bending operations, means for then bending said leg portions in proximity to their ends to provide clinching parts thereon, means for thereafter bending said leg end portions back parallel to said loop portion and up against the opposite surface of said sheet member, means including guide means engageable by said clinching parts and cooperable with said last named means as said last named means bends said leg end portions up against said opposite surface of said sheet member for causing said clinching parts to be driven back through said sheet member in a direction opposite to said one direction to thereby dispose said clinching parts beyond said one surface of said sheet member, and means for thereafter clinching said clinching parts over said legs and against said one surface to thereby secure said staple to said sheet member.

6. A wire staple fastener apparatus comprising means for forming from a length of wire a substantially U-shaped staple having a loop portion and a pair of legs, means for holding said loop portion and bending an end portion of each of said legs to a plane at right angles to the plane of said loop portion, means for embracing and supporting said legs and for driving said leg end portions through a sheet member in one direction from one surface thereof at a location such that said staple is spaced from the edges of said sheet member, further means for holding said loop portion during subsequent bending operations, means for then bending said leg portions in proximity to their ends to provide clinching parts thereon, means for thereafter bending said leg end portions back parallel to said loop portion and up against the opposite surface of said sheet member, means including guide means engageable by said clinching parts and cooperable with said last named means as said last named means bends said leg end portions up against said opposite surface of said sheet member for causing said clinching parts to be driven back through said sheet member in a direction opposite to said one direction to thereby dispose said clinching parts beyond said one surface of said sheet member, means for thereafter clinching said clinching parts over said legs and against said one surface to thereby secure said staple to said sheet member, and means for ejecting said staple from said last named holding means.

7. A wire staple fastener apparatus comprising a staple forming assembly for forming from a length of wire a reversely-bent staple having a loop portion and a pair of legs; a leg bending assembly including means for holding said loop portion, means for bending an end portion of each of said legs to a plane angularly related to said loop portion, and means for driving said bent leg end portions through a sheet member in one direction from one surface thereof at a location such that said staple is spaced from the edges of said sheet member, said driving means including means for embracing and supporting said leg end portions during said driving; and a leg end portion clinching assembly including further means for holding said loop portion, means for bending said leg end portions in proximity to their ends to provide clinching parts thereon, means for thereafter bending said leg end portions back toward said loop portion and up against the opposite surface of said sheet member, means including guide means engageable by said clinching parts and cooperable with said last named means as said last named means bends said leg end portions up against said opposite surface of said sheet member for causing said clinching parts to be driven back through said sheet member in a direction opposite to said one direction to thereby dispose said clinching parts beyond said one surface of said sheet member, and means for thereafter bending said clinching parts over said legs and clinching said clinching parts against said legs and said one surface to thereby secure said staple to said sheet member.

8. The invention set forth in claim 7 characterized by the addition of ejection means for ejecting said loop from said last mentioned holding means at the completion of clinching of said clinching parts.

9. A wire staple fastener apparatus for fastening to a sheet member a staple comprising a length of wire having a pair of legs and an intermediate portion between said legs which includes shoulders, said apparatus comprising means for driving at least portions of said legs through the sheet member in one direction from one surface thereof and for applying said intermediate portion against said surface, means for then bending each of said leg portions in proximity to their ends to provide clinching parts thereon, means for thereafter reversely bending said leg portions toward the opposite surface of said sheet member and in a direction toward said shoulders, means including guide means engageable by said clinching parts and cooperable with said last-named means for causing said clinching parts to be driven back through said sheet member in a direction opposite to said one direction to thereby dispose said clinching parts beyond said one surface of said sheet member and in proximity to said shoulders, and means for thereafter clinching said clinching parts over said shoulders and against said one surface to thereby secure the staple to said sheet member.

10. A wire staple fastener apparatus comprising means for forming from wire a reversely-bent staple having a loop portion, a pair of shoulder portions beyond said loop portion, and a pair of legs beyond said shoulders, means for holding said loop and shoulder portions and bending an end portion of each of said legs to a plane angularly related to said loop and shoulder portions, means for confining said legs to maintain them relatively rigid and for driving said leg end portions through a sheet member in one direction from one surface thereof at a location such that said staple is spaced from the edges of said sheet member and while said legs are so confined, means for then bending said leg end portions in proximity to their ends to provide clinching parts thereon, means for thereafter bending said leg end portions back toward said loop and said shoulder portions along straight paths snugly up against the opposite surface of said sheet member, means including guide means engageable by said clinching parts and cooperable with said last-named means as said last-named means bends said leg end portions up against said opposite surface of said sheet member for causing said clinching parts to be driven back through said sheet member in a direction opposite to said one direction to thereby dispose said clinching parts beyond said one surface of said sheet member and in proximity to said shoulders, and means for thereafter clinching said clinching parts over said shoulders and against said one surface to thereby secure said staple to said sheet member.

References Cited in the file of this patent

UNITED STATES PATENTS

| | | |
|---|---|---|
| 1,829,769 | Strombeck | Nov. 3, 1931 |
| 1,900,181 | Hile | Mar. 7, 1933 |
| 1,907,355 | Hile | May 2, 1933 |
| 1,950,795 | Hile | Mar. 13, 1934 |
| 2,099,411 | Schmidtke | Nov. 16, 1937 |
| 2,741,419 | Janz | Apr. 10, 1956 |
| 2,822,973 | Armstrong | Feb. 11, 1958 |
| 2,896,214 | Wright | July 28, 1959 |
| 2,933,733 | Strollis | Apr. 26, 1960 |

UNITED STATES PATENT OFFICE

CERTIFICATE OF CORRECTION

Patent No. 3,075,196

January 29, 1963

Theodore M. Wright

It is hereby certified that error appears in the above numbered patent requiring correction and that the said Letters Patent should read as corrected below.

Column 1, line 69, after "Patent" insert -- No. --; column 3, line 8, for "mecahnism" read -- mechanism --; column 4, line 64, after "160", second occurrence, strike out the period; column 5, line 32, before "as" insert an opening parenthesis; column 6, line 15, after "motion" insert -- of --; line 37, for "Feference" read -- Reference --; line 72, for "sam" read -- cam --; column 8, line 64, strike out "inwardly"; column 12, line 40, for "disposed" read -- dispose --.

Signed and sealed this 3rd day of September 1963.

(SEAL)
Attest:

ERNEST W. SWIDER
Attesting Officer

DAVID L. LADD
Commissioner of Patents